April 20, 1937.   L. D. JONES   2,077,799
PROCESS AND APPARATUS FOR THE SEPARATION OF SLUDGE FROM A LIQUID
Filed May 16, 1934    2 Sheets-Sheet 1

*INVENTOR.*
Leo D. Jones
BY Maurice A. Crews
*ATTORNEY.*

April 20, 1937.   L. D. JONES   2,077,799
PROCESS AND APPARATUS FOR THE SEPARATION OF SLUDGE FROM A LIQUID
Filed May 16, 1934   2 Sheets-Sheet 2
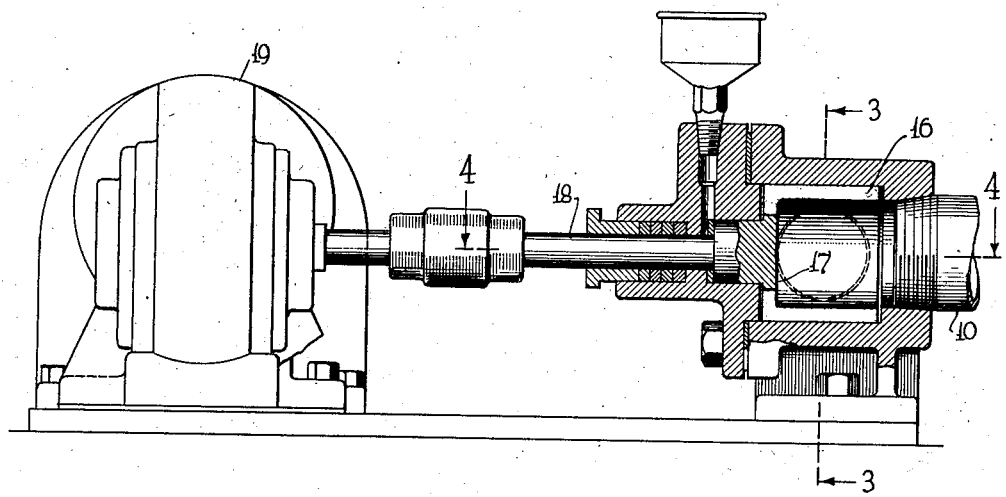
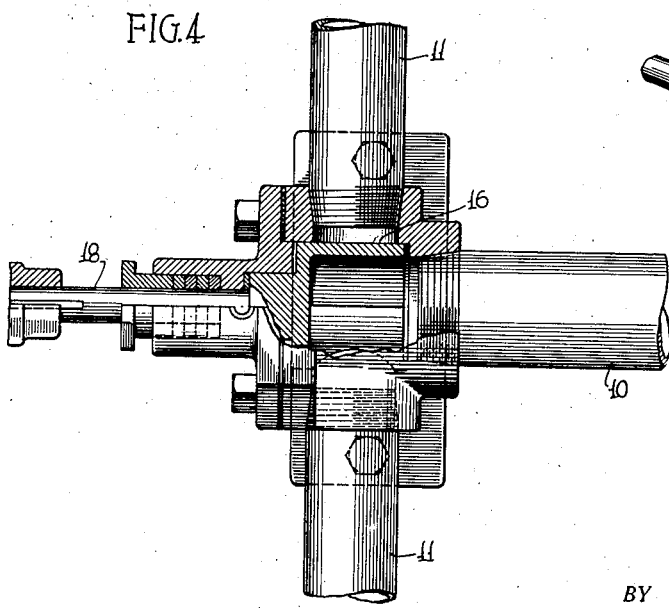
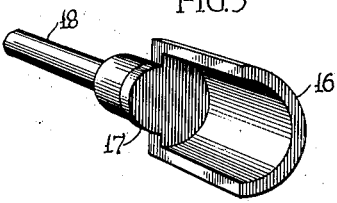
INVENTOR.
Leo D. Jones
BY Maurice A. Crews
ATTORNEY.

Patented Apr. 20, 1937

2,077,799

UNITED STATES PATENT OFFICE 2,077,799

PROCESS AND APPARATUS FOR THE SEPARATION OF SLUDGE FROM A LIQUID

Leo D. Jones, Philadelphia, Pa.

Application May 16, 1934, Serial No. 725,876

9 Claims. (Cl. 196—40)

The present invention relates to the art of chemically treating liquid products to produce a suspension of sludge in liquid and to the arts of feeding liquids having a tendency to solidify or deposit suspended sludge in solid and adhesive form and of separating suspended material from liquids of this character. It was conceived in connection with research with respect to the problem of removing undesired ingredients from petroleum lubricating oil stock by treatment with sulphuric acid and it has found its principal application in connection with the problem of forming an acid sludge by such treatment and separating the acid sludge so formed from the petroleum stock by the use of centrifugal separators.

In the acid treatment of lubricating oil stock, a suspension of viscous sludge is formed which has a strong tendency to separate from the oil by subsidence. Precautions must accordingly be taken in connection with the design of conduits for flowing a suspension of such sludge in oil in order to prevent deposition and solidification of the sludge within the conduits and consequent necessity for frequent shut-downs for the purpose of cleaning deposited sludge from the conduits. In cases in which relatively quiescent bodies of sludge-containing oil are allowed to stand in portions of the conduits, such deposition is unusually likely to occur, and the present invention was conceived with especial reference to the avoidance of sludge deposition in connection with a system which, under ordinary conditions of flow would entail the occasional existence of such quiescent bodies.

The nature of the problem involved and the solution presented in the present invention will be better understood by a reading of the subjoined specification in the light of the attached drawings, in which:

Fig. 2 is a detailed vertical section through a valve forming an important part of the invention and means for controlling the valve, parts being shown in side elevation.

Fig. 4 is a section on the line 4—4 of Fig. 3, and

Fig. 5 is a detailed view illustrating the construction of the control member of the valve illustrated in Figs. 2, 3 and 4.

Figure 1:
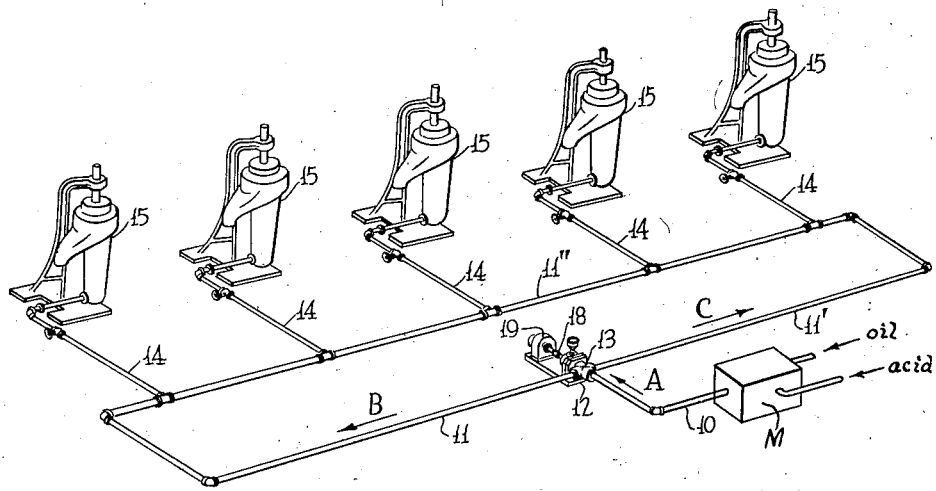
Figure 1 is a diagrammatic perspective view illustrating the process and apparatus of the invention.
Figure 3:
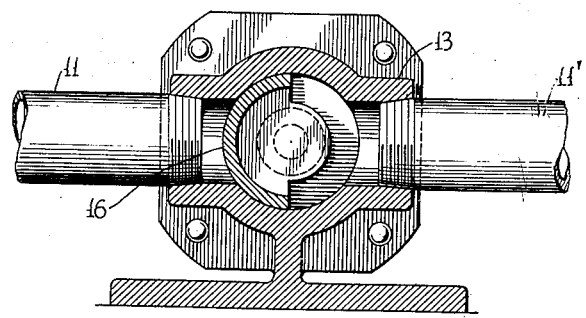
Fig. 3 is a section on the line 3—3 of Fig. 2.

Referring to the drawings by reference characters, the numeral 10 indicates a conduit into which a liquid is passed, as indicated by the arrow A. Such liquid may contain suspended sludge and may comprise, for example, petroleum lubricating oil containing acid sludge formed by the sulphuric acid treatment thereof in mixer M. This liquid is passed through valve mechanism 12 into parallel conduits 11 and 11' from which it is passed to separating apparatus by means of an interconnecting conduit 11'' which communicates with both of the conduits 11 and 11' and with the separating apparatus. The interconnecting conduit 11'' communicates with the subsidence separating apparatus, such as a battery of centrifugal separators 15, arranged in parallel, by means of branch conduits 14. In the case of the separation of acid sludge from acid treated oil, the centrifugal separators 15 effect separate and continuous discharge of sludge and purified oil.

The novel feature of the invention consists in the feed of liquid under treatment, such as sludge-containing oil, alternately in opposite directions through the parallel conduits 11 and 11' into the conduit 11'' from which it is fed to the separating apparatus. Such alternate feed is accomplished by means of the novel valve mechanism illustrated in detail in Figs. 2 to 5 of the drawings. The valve mechanism comprises a casing 13 containing openings adapted to communicate with the conduits 10, 11 and 11' and provided with a rotating cylinder valve 16 adapted alternately to preclude communication between the conduit 10 and the conduits 11 and 11' respectively, while allowing communication between the conduit 10 and the other of these last mentioned conduits. The casing 13 and valve 16 are designed to maintain communication between the conduit 10 and one or the other of the conduits 11 and 11' at all times and the design is such as to afford a brief interval of communication between conduit 10 and conduits 11 and 11' simultaneously between reversals. In this connection it is to be noted that the valve 16 occupies an arc of 180° and that the portions of the casing 13 communicating with the respective conduits 11 and 11' are symmetrically arranged with respect to each other. It will be seen that, by reason of this construction, the sum of the areas of communication between the interior of the casing 13 and the conduits 11 and 11' is constant regardless of the position occupied by the valve 16. Thus, the degree to which flow through one or the other of these conduits may be restricted at any given instant by the valve 16 is exactly equal to the permitted flow through the other conduit. This arrangement affords a constant pressure drop between the conduit 10 and the conduit 11'', regardless of the particular position occupied by the valve 16. The valve 16 is secured through its inner end 17 to a shaft 18 which is rotated at a relatively constant speed by suitable means, such as a prime mover 19.

In the operation of the system the prime mover 19 serves to rotate the valve 16 during feed of liquid into the valve casing 13 through the conduit 10 and alternately to establish communication between this conduit 10 and the conduits 11 and 11' thereby effecting feed of liquid through the conduits 11 and 11' alternately into the conduit 11'' and thence into the battery of centrifugal separators. The rate of rotation of the valve 16 within the casing 13 is preferably co-ordinated with the rate of feed of liquid through the conduit 10 and the capacity of the separating apparatus in such a way as to feed an amount of liquid during any given cycle of passage of oil through the conduit 11 or 11' which is substantially less than the total capacity of the separating apparatus. In the case of centrifugal separation, a control of this kind is especially important because of the following considerations. In a system of the type illustrated in Fig. 1, feed of liquid continuously in the direction indicated by the arrow B through a succession of identical parallel branch conduits 14 and centrifugal separators 15 arranged in parallel would result in the passage of a substantially larger quantity of liquid to the centrifugal separator on the left-hand end of Fig. 1 than to that on the right-hand end and the quantities of liquid fed to the respective centrifuges would be progressively greater in the successive centrifuges from right to left. Such varying rate of feed to the identical separating units is, of course, undesirable as it entails an operation of certain of the centrifuges at a rate at which their maximum efficiency is not attained. If, however, the direction of feed of material to the system is reversed after feed in a given direction for a sufficient period of time to effect a feed of liquid to the battery of centrifuges representing half of their capacity or a fraction thereof, the average rate of feed to each separator during the discharge therefrom of a quantity of liquid representing its capacity will be equal. By frequent reversal of the valve 16, it is, therefore, possible to operate the centrifuges at their maximum efficiency.

The advantages attained by the use of the apparatus and practice of the process of the invention will now be apparent. By alternately feeding liquids which, when quiescent, have a tendency to cause conduit cloggage in the parallel interconnected conduits 11 and 11', the quiescence which might otherwise occur in the main feed conduit in connection with the shutdown of centrifuges most remote from the zone of feed is effectively avoided, as is also the relatively greater tendency toward cloggage under normal conditions of feed in the portions of the main feed conduit most remote from the impelling force. It will, therefore, be seen that the use of the apparatus and the practice of the process of the invention result in avoidance of cloggage of the main conduit through which liquid is impelled to the separating apparatus and that the individual centrifugal separators are each operated, in the practice of the invention, at an average rate of feed best adapted to effect efficient separation.

While the invention has been described with especial reference to the treatment of petroleum lubricating oils with acid and the separation of acid sludge from the suspension so formed, it will be understood that certain of its aspects are applicable to other problems of separation and, indeed, that the impelling method and apparatus of the invention are applicable to other problems involved in the feed of liquids which have a tendency to cause the cloggage of conduits by reason of solidification or precipitation of material in solid and adhesive form.

Modifications will be obvious to those skilled in the art and I do not, therefore, wish to be limited except by the scope of the sub-joined claims.

I claim:

1. In the chemical treatment of oils, the method which comprises passing an oil and a reagent to a mixing zone, intimately admixing oil and reagent in said mixing zone to produce a sludge suspended in the oil and adapted to be separated therefrom by subsidence, and continuously impelling the suspension of sludge in oil alternately at timed intervals through two interconnected parallel conduits to parallel subsidence separating zones.

2. In the separation of sludge from a liquid in which it is suspended, the process which comprises continuously impelling the suspension of sludge in liquid alternately at timed intervals through two interconnected parallel conduits to parallel subsidence separating zones.

3. In the chemical treatment of oils, the method which comprises passing an oil and a reagent to a mixing zone, intimately admixing oil and reagent in said mixing zone to produce a sludge suspended in the oil and adapted to be separated therefrom by subsidence and impelling the suspension of sludge in oil through two interconnected parallel conduits to subsidence separating zones by a sequence of impelling operations which comprises alternately at timed intervals impelling the suspensions through said parallel conduits.

4. In the performance of a purifying operation with respect to liquid material containing sludge adapted to effect cloggage of conduits upon solidification, the process which comprises impelling the liquid material containing sludge through parallel conduits to plural parallel separating apparatus by a sequence of impelling operations which comprises alternately at timed intervals impelling the material through two parallel conduits, the amount of material fed during any given impelling step through one of the conduits being less than the capacity of the separating apparatus.

5. In apparatus for chemically treating oils, the combination comprising means for effecting an intimate admixture between an oil and a reagent to produce a sludge suspended in the oil and adapted to be separated therefrom by subsidence, and means for automatically impelling the suspension of sludge in oil alternately at timed intervals through parallel interconnected conduits to a battery of centrifugal separators.

6. In apparatus for chemically treating oils, the combination comprising means for effecting an intimate admixture between an oil and a reagent to produce a sludge suspended in the oil and adapted to be separated therefrom by subsidence, a pair of parallel interconnected conduits interconnecting said mixing means and subsidence separating apparatus, a valve for directing suspension alternately through said parallel conduits, and automatic means for operating said valve to effect intermittent alternate feed through the respective parallel conduits.

7. In apparatus for chemically treating oils, the combination comprising means for effecting an intimate admixture between an oil and a reagent to produce a sludge suspended in the oil and adapted to be separated therefrom by subsidence, a pair of parallel interconnected conduits interconnecting said mixing means and a battery of centrifugal separators, a valve for directing suspension alternately through said parallel conduits, and automatic means for operating said valve to effect intermittent alternate feed through the respective parallel conduits.

8. In apparatus for effecting feed of liquid material containing sludge adapted to effect cloggage of conduits upon solidification, the combination comprising a pair of parallel interconnected conduits through which the liquid material containing sludge is adapted to be impelled, a valve for directing fluid material alternately at timed intervals through the respective parallel conduits and automatic means for effecting the operation of said valve.

9. In the chemical treatment of oils, the method which comprises passing an oil and a reagent to a mixing zone, intimately admixing oil and reagent in said mixing zone to produce a sludge suspended in the oil and adapted to be separated therefrom by subsidence in a conduit, and continuously impelling the suspension of sludge in oil alternately at timed intervals through two interconnected parallel conduits to parallel separating zones.

LEO D. JONES.

CERTIFICATE OF CORRECTION.

Patent No. 2,077,799.　　　　　　　　　　　　　　　　April 20, 1937.

LEO D. JONES.

It is hereby certified that error appears in the printed specification of the above numbered patent requiring correction as follows: Page 2, second column, line 41, claim 3, before the word "subsidence" insert parallel; and line 44, same claim, for "suspensions" read suspension; and that the said Letters Patent should be read with these corrections therein that the same may conform to the record of the case in the Patent Office.

Signed and sealed this 24th day of August, A. D. 1937.

Leslie Frazer (Seal)　　　　　　　　　　　　　　　　Acting Commissioner of Patents.